Figure 1:
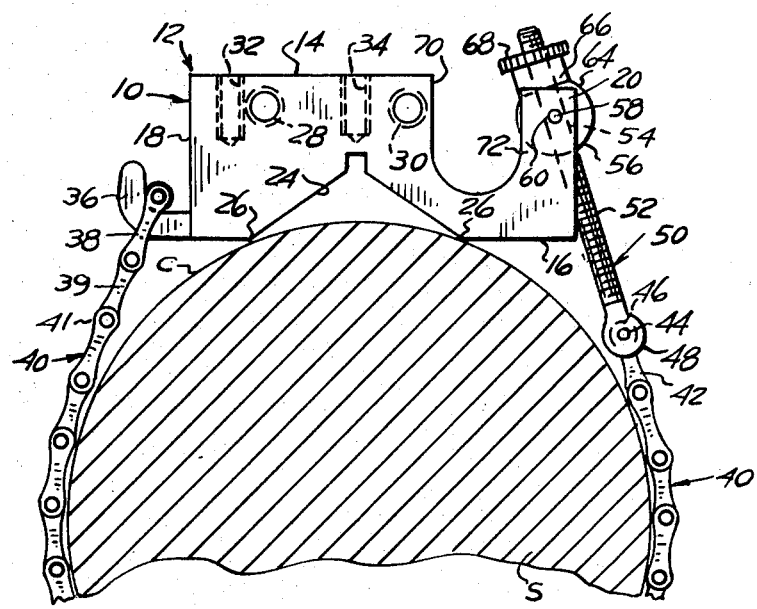

United States Patent

[11] 3,631,604

[72] Inventor  Stanley J. Schenavar
               12771 Hemingway, Detroit, Mich. 48239
[21] Appl. No. 841,891
[22] Filed     July 15, 1969
[45] Patented  Jan. 4, 1972

[54] WORKPIECE ALIGNING DIAL INDICATOR HOLDER
     3 Claims, 2 Drawing Figs.
[52] U.S. Cl. .................................................. 33/180 R,
                                                 33/84, 248/231
[51] Int. Cl. .................................................. G01b 3/30
[50] Field of Search ......................................... 248/231;
                                                 33/180 R, 84

[56] References Cited
     UNITED STATES PATENTS
     2,634,939   4/1953   Voss ............................... 33/84 X
     3,241,800   3/1966   Richter ............................ 248/231
     3,244,392   4/1966   Sheets ............................ 33/180 A X
     3,525,158   8/1970   Torlay ............................ 33/180 R

*Primary Examiner*—William D. Martin, Jr.
*Attorney*—Barthel & Bugbee

ABSTRACT: An elongated V-block has two pairs of threaded holes therein for the mounting of either of two conventional dial indicators. A chain connection projection on one end of the block receives any selected link of a work-encircling chain. The other end of the chain is pivotally connected to the forward end of a chain-tightening screw slidably engaging a rocking barrel pivotally mounted on the other end of the block. The rocking barrel rocks on its trunnions to constantly position the screw tangential to the workpiece regardless of its diameter and thereby subjects the screw solely to axial forces and eliminates oblique thrusts thereon. Threaded onto the screw above the trunnion barrel against a flat thereon is a thumb nut adapted to swing into a notch in the block when tightening the chain around a large-diameter workpiece.

PATENTED JAN 4 1972

3,631,604

INVENTOR
STANLEY J. SCHENAVAR

BY Barthel & Bugbee
ATTORNEYS

WORKPIECE ALIGNING DIAL INDICATOR HOLDER

Figure 2:
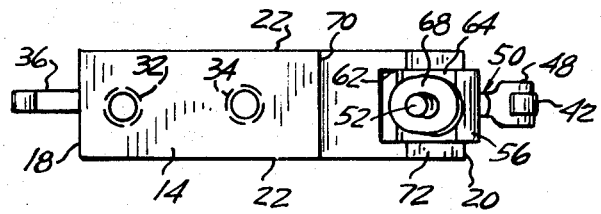

In the drawings,

FIG. 1 is a side elevation of a dial indicator holder according to one form of the invention, as mounted on a shaft shown in cross section with the dial indicator omitted; and FIG. 2 is a top plan view of the dial indicator holder shown in FIG. 1 with the shaft and chain omitted except for the permanently anchored link thereof.

Referring to the drawing in detail, FIG. 1 shows a dial indicator holder, generally designated 10, according to one form of the invention, such as is used for aligning cylindrical workpieces such as shafts, couplings, pipes and the like, such a workpiece in the form of a shaft S being shown supporting the dial indicator holder 10. The shaft S has an external cylindrical surface C on which the dial indicator holder 10 is mounted. The dial indicator holder 10 includes an elongated mounting block 12, preferably of carbon steel and preferably of rectangular shape, having a top 14, a bottom 16, opposite ends 18 and 20, and opposite sides 22. Formed in the bottom 16 somewhat nearer the end 18 than the end 20 is an inverted V-groove 24 extending between the opposite sides 22 and joining the preferably flat bottom 16 in sharp parallel edges 26. One side 22 of the block 12 is provided with two threaded holes 28 and 30 while the top 14 is provided with two threaded holes 32 and 34 with their axes at right angles to the axes of the holes 28 and 30. The holes 28 and 30, for example, are adapted to receive the threaded supports (not shown) of the conventional dial indicator (not shown) manufactured by the L. S. Starrett Company of Athol, Mass., while the other pair of holes 30 and 34 are similarly adapted to receive the threaded supports (not shown) of the conventional dial indicators (not shown) manufactured by the Lufkin Rule Company of Saginaw, Mich.

Extending longitudinally outward from the end 18 of the block 12 is a flexible member attachment portion or hook 36 which is adapted to receive any selected link 38 of an elongated flexible work-encircling link chain, generally designated 40, preferably of the roller chain type with longitudinally spaced openings 39 between its link pivots 41. The chain 40 extends around the shaft S and its permanently anchored opposite end link 42 is pivotally connected to a pivot pin 44 mounted in the cross bore 46 in the enlarged head 48 on the forward end of an elongated chain-tightening screw 50, the threaded shank 52 of which passes through and slidably engages a transverse smooth bore 54 in a rocking abutment or trunnion barrel 56. The trunnion barrel 56 is provided at its opposite ends with trunnions 58 which tiltably engage coaxial bores 60 formed in the opposite sides of a slot 62 in the top 14 of the block 12 adjacent the end 20 thereof.

Formed on one side of the trunnion barrel 56 is a flat surface 64 which is engaged by the bottom surface 66 of a thumb nut 68 threaded upon the upper end of the threaded shank 52 of the chain-tightening screw 50. Immediately behind the trunnion barrel 56, the block 12 is provided with a U-notch 70 extending downward therein from the top 14 thereof. The notch 70 is of such width and depth as to provide clearance for the thumb nut 68 and upper end portion of the threaded shank 52 of the chain-tightening screw 50 when the chain 40 is caused to encircle the extremely large diameter shaft, coupling, pipe or the like which causes the head 48 on the screw 50 to swing outward in the trunnion barrel 56 and consequently causes the thumb nut 68 and adjacent end portion of the screw shank 52 to swing downward into the notch 70. Thus, the notch 70 forms an upstanding slotted post 72 at the end 70 of the block 12.

In the operation of the device, the selected dial indicator (not shown) is mounted in either pair of threaded holes 28, 32 or 30, 34. The block 12 is then placed upon the cylindrical surface C of one of the shafts, couplings or pipes S to be aligned, with the parallel knife edges 26 of the V-groove 24 engaging the surface C. The chain 40 is then passed around the surface C of the shaft S and the nearest link 38 thereof hooked over the hook 36 with the remaining free end portion of the chain 40 permitted to dangle. This free end portion has been omitted from FIG. 1 in order to simplify the disclosure and avoid obscuring the hook 36.

It will be understood by those skilled in this art that the opposing shaft, coupling or pipe (not shown) to be aligned with the shaft, coupling or pipe S is disposed end-to-end therewith. The thumb nut 68 is then tightened against the flat surface 64 of the trunnion barrel 56, causing the barrel 56 to rock on its trunnions 58 as the screw shank 52 is drawn upward through the smooth bore 54 of the trunnion barrel 56 and the chain 40 is correspondingly tightened around the shaft S. The dial indicator (not shown) then is caused to measure the misalignment of the two shafts, couplings, or pipes, as the case may be, and these rotated relatively to one another and shims added or removed to raise or lower the shaft bearing housing (not shown) until the shafts are accurately aligned in a vertical direction. If there is found to be a horizontal misalignment of the shafts, the bearing housing of one shaft may be moved laterally in order to accurately align the shafts horizontally. An angular misalignment of the shaft may be similarly corrected.

It will be evident from FIG. 1 that the rocking trunnion barrel 56 always maintains the axis of the screw 50 tangential to the cylindrical surface C of the workpiece S regardless of the diameter of the workpiece S, whether large or small. As a result, the only force exerted on the tightening screw 50 is axial and no transverse or oblique components of force are imposed thereon. Consequently, there is never any tendency or danger for the screw 50 to be bent or deformed by any such oblique or transverse forces, or excessive wear caused thereby, to which defects certain prior art dial indicator holders are subject.

I claim:

1. A dial indicator holder for use in the alignment of workpieces with cylindrical portions thereon, said holder comprising a mounting block having a V-groove therein adapted to self-aligningly engage a cylindrical workpiece portion and having means thereon for holding the support of a conventional dial indicator, said block at one end having a chain attachment element and at its opposite end having a transversely disposed pivot portion, a rocking abutment pivotally engaging said pivot portion and having a bore therethrough disposed perpendicular to the pivot axis of said pivot portion, an elongated flexible workpiece-encircling chain having longitudinally spaced openings therein adapted to selectively receive and detachably engage said attachment portion, and a screw-operated chain tightening device mounted in said bore and having at one end thereof a pivotal connection with said chain, said bore being a smooth bore and said chain-tightening device including a screw slidably engaging said bore and having said pivotal connection with said chain disposed transverse to the axis of said screw, said tightening device also including a chain-tightening nut threaded onto said screw and abuttingly engaging said rocking abutment, said connection between said chain and said screw being constantly disposed between said block and the cylindrical workpiece portion in constantly spaced relationship therewith, said block having a slot therein disposed perpendicular to the pivot axis of said pivot portion, and said screw passing through said slot and swingable therein.

2. A workpiece-aligning dial indicator holder, according to claim 1, wherein said pivot portion includes coaxial pivot bores in said sidewalls, and wherein said abutment has pivot pin means associated therewith pivotally engaging said bores, said pivot means comprising coaxial trunnions secured to and projecting from the opposite ends of said abutment into said pivot bores.

3. A workpiece-aligning dial indicator holder, according to claim 1, wherein said block has a recess disposed rearwardly of said nut and configured to provide clearance space therein for receiving said nut in response to swinging of said screw.

* * * * *